(12) United States Patent
Freudenthal et al.

(10) Patent No.: US 9,813,661 B2
(45) Date of Patent: Nov. 7, 2017

(54) SYSTEM AND METHOD FOR DETERMINING AN INACTIVE TELEVISION CHANNEL

(71) Applicant: Watchanator, Inc., Jacksonville Beach, FL (US)

(72) Inventors: Leonard Scott Freudenthal, Jacksonville Beach, FL (US); Gregory Andrew Anderson, Ponte Vedra Beach, FL (US); Percy F. Shadwell, Jr., Jacksonville, FL (US); Frank David Freudenthal, St. Joseph, MO (US)

(73) Assignee: WATCHANATOR, INC., Ponte Vedra Beach, FL (US)

( * ) Notice: Subject to any disclaimer, the term of this patent is extended or adjusted under 35 U.S.C. 154(b) by 0 days.

(21) Appl. No.: 15/063,438

(22) Filed: Mar. 7, 2016

(65) Prior Publication Data

US 2016/0261820 A1    Sep. 8, 2016

Related U.S. Application Data

(60) Provisional application No. 62/128,977, filed on Mar. 5, 2015.

(51) Int. Cl.
| | | |
|---|---|---|
| *H04N 5/50* | (2006.01) | |
| *H04N 21/2543* | (2011.01) | |
| *G06K 9/00* | (2006.01) | |
| *H04H 20/12* | (2008.01) | |
| *H04N 17/04* | (2006.01) | |
| *H04H 60/29* | (2008.01) | |
| *H04H 60/56* | (2008.01) | |
| *H04H 60/63* | (2008.01) | |
| *H04N 21/41* | (2011.01) | |
| *H04N 21/44* | (2011.01) | |
| *H04N 21/442* | (2011.01) | |

(Continued)

(52) U.S. Cl.
CPC ........... *H04N 5/50* (2013.01); *G06K 9/00711* (2013.01); *G06K 9/46* (2013.01); *H04H 20/12* (2013.01); *H04H 60/29* (2013.01); *H04H 60/56* (2013.01); *H04H 60/63* (2013.01); *H04N 17/04* (2013.01); *H04N 21/2543* (2013.01); *H04N 21/4126* (2013.01); *H04N 21/44008* (2013.01); *H04N 21/44204* (2013.01); *H04N 21/6581* (2013.01); *G06K 2209/03* (2013.01)

(58) Field of Classification Search
None
See application file for complete search history.

(56) References Cited

U.S. PATENT DOCUMENTS

| | | | | |
|---|---|---|---|---|
| 7,603,695 B2 * | 10/2009 | Kim | ................... | H04N 5/44543 725/151 |
| 7,882,514 B2 * | 2/2011 | Nielsen | ................... | H04H 60/32 725/10 |

(Continued)

*Primary Examiner* — Omar S Parra
(74) *Attorney, Agent, or Firm* — Mark Young, PA

(57) ABSTRACT

An image analysis system and method determines whether a channel is active by intercepting signals from a set-top box and determining whether the signals correspond to an inactive channel by analyzing pixels, recognized text and/or audio in the signal stream. The system and method controls tuning of the set-top box to each channel to be tested. Data relating to the analysis may be stored and transmitted for processing credit requests.

16 Claims, 6 Drawing Sheets

(51) Int. Cl.
*H04N 21/658* (2011.01)
*G06K 9/46* (2006.01)

(56) References Cited

U.S. PATENT DOCUMENTS

| | | | | |
|---|---|---|---|---|
| 2005/0157215 A1* | 7/2005 | Minnick | ............ | H04N 21/4147 |
| | | | | 348/725 |
| 2008/0273114 A1* | 11/2008 | Hardacker | ............. | H04H 60/48 |
| | | | | 348/468 |
| 2009/0089852 A1* | 4/2009 | Randolph | .............. | H04H 60/32 |
| | | | | 725/131 |
| 2009/0144764 A1* | 6/2009 | Mehta | ................ | H04N 7/17318 |
| | | | | 725/1 |
| 2011/0317020 A1* | 12/2011 | Medina | ................ | H04N 17/004 |
| | | | | 348/192 |
| 2016/0198152 A1* | 7/2016 | Chin | ....................... | G06F 11/30 |
| | | | | 725/107 |

* cited by examiner

SYSTEM AND METHOD FOR DETERMINING AN INACTIVE TELEVISION CHANNEL

RELATED APPLICATION

This application is a nonprovisional of and claims the benefit of priority of U.S. Provisional Application 62/128, 977 filed 5 Mar. 2015, the entire contents of which are incorporated herein by this reference and made a part hereof.

FIELD OF THE INVENTION

This invention relates generally to television, and, more particularly, to an image analysis system and method for determining whether a channel is inactive and making a record of channel outages.

BACKGROUND

In today's television market many consumers pay a fee to program providers for a certain set of available channels. Usually the fee charged is related to the total number and type of channels being made available to the consumer. Certain channels may be more expensive per unit time than others based on the demand of that type of programming.

When one purchases a collection of program channels from a supplier, it is understood that all the channels in that contracted set would be available at any time that the consumer chooses to view them. Therefore, if a subset or the totality of the agreed collection of channels should become unavailable for any reason, including equipment failure, the program provider has failed to deliver the agreed upon product. While a consumer may be viewing only one of these channels at any given moment, the expectation is that any of the other channels included in the contract are available for use.

Service providers may credit a consumer's account to compensate for interruptions of service. Typically, however, such a credit is provided only after request by a subscribing customer. Cable and satellite television agreements typically entitle a customer to a credit, upon timely request by the customer, for prolonged or repeated outages. Some states mandate credits for certain outages, but only when timely requested by a consumer. For example, by statute, Connecticut (Conn. Gen. Stat. §16-331w), Maine (30-A M.R.S. §3010), West Virginia (W. Va. Code §24D-1-16), New Jersey (N.J. Stat. §48:5A-11a) and New Hampshire (RSA 53-C:3-c) require credits to offset certain outages when requested by consumers.

A problem with the aforementioned contractual and statutory framework for credits is that a consumer may not know when an outage occurs, or the duration of an outage, much less the frequency of outages. Outages may occur when a consumer is not watching television or not watching a channel affected by the outage. Even if a consumer observes that a channel is unavailable, the consumer may not know when the outage began and may not detect when the outage ends. Thus, the duration of the outage is unknown. The consumer probably will also not know each channel for which service has been interrupted or the frequency of interruption. Without such knowledge, a consumer cannot accurately report outages and secure credit.

A tool is needed to detect and record outages, the duration of outages and the frequency of outages for each subscribed channel. The tool should not interfere with or require modification of current cable or satellite television equipment. The tool should also not interfere with a user's use and enjoyment of a television.

The invention is directed to overcoming one or more of the problems and solving one or more of the needs as set forth above.

SUMMARY OF THE INVENTION

To solve one or more of the problems set forth above, in an exemplary implementation of the invention, an image analysis system and method for determining whether a channel is active and making a record of channel outages are provided. A system and method are provided for determining the state of a television channel supplied to a television through an appliance (e.g., a set-top box). The appliance (e.g., a set-top box or other service provider receiving device that supplies signals for a tuned channel to a television) includes a tuner and outputs television signals for a tuned television channel. The system includes a signal input operably coupled to the appliance. The input receives television signals for a tuned television channel from the appliance. An analyzer operably coupled to the signal input determines if the television signals for the tuned television channel correspond to a channel that is inactive, such as by using one or more of several analysis techniques. A port replicator, operably coupled to the signal input, outputs the television signals for the tuned television channel to the television. The system and method controls tuning of the appliance to each channel to be tested. Data relating to the analysis may be stored and transmitted for processing credit requests.

A remote control output controls the appliance. Such control may entail powering on the appliance. Such control may also entail causing the appliance to tune to each television channel from a plurality of available television channels. Tuning commands may be communicated to the appliance wirelessly (e.g., via RF or infrared communication) or via a wired connection including a command communication channel, as in an HDMI® connection. As each channel is tuned, the system analyzes the television signals for the tuned channel to determine if the channel is active or inactive.

An on-screen message generator produces a message for display on the television. The message requests a user to perform a detectable action to indicate that the user is currently using the television. The detectable action may comprise pressing a button on a remote control, thereby causing the remote control to emit a sensible signal. If no such sensible signal is emitted, the system may proceed with channel selection and analysis as if no user is using the television.

A storage device stores data corresponding to determinations of inactivity by the analyzer. A transmitter transmits data corresponding to determinations of inactivity by the analyzer. Such data may be transmitted to a remote computer for further transmission, storage, analysis and/or reporting.

Various processes may be implemented to determine if the television signals for the tuned television channel correspond to a channel that is inactive. One such process entails determining if total brightness of pixel elements remains constant between successive frames. Another such process entails determining if a total number of pixels that exceed a specific brightness is constant between successive frames. Still, another process entails optical character recognition of text in a frame for the channel, whereby text corresponding to an outage message may be determined. Yet another process entails determining if the television signals are devoid of audio signals.

BRIEF DESCRIPTION OF THE DRAWINGS

The foregoing and other aspects, objects, features and advantages of the invention will become better understood with reference to the following description, appended claims, and accompanying drawings, where:

Figure 1:
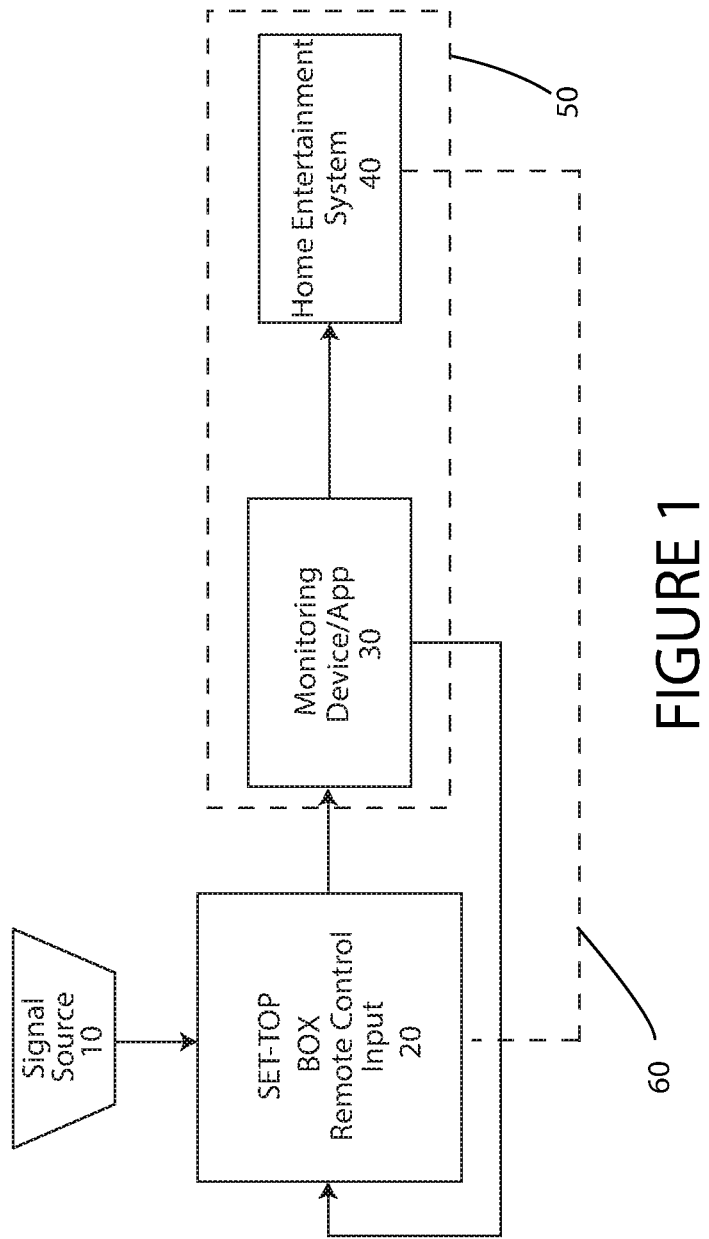
FIG. 1 is a high level block diagram that conceptually illustrates a television system with an exemplary channel monitoring device according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Typically, when a television program provider has a loss of service on a particular channel, the video stream on that channel may display a message, or other placeholder image, that indicates that this channel is not available at that time. Though the message may be moved around the screen the general content and color is not changed over time. An image analysis system and method for determining whether a channel is active and making a record of channel outages according to principles of the invention identifies when normal programming on a channel has been replaced with one of these patterns or messages.

Though television programming may be transmitted and coded in many ways, ultimately all programming is a collection of time varying pixel and audio values. By way of example and not limitation, each picture element in the image field may be defined as a red, green, and blue intensity value in a two dimensional array. In terms of computer data, the image may be thought of as a two dimensional data array where each element in the array comprises three unique values. The entire array is re-written at a pace equal to the frame rate of the image being viewed.

Similarly, the audio component of the program is on one or more channels where the amplitude numerical value changes at a rate of up to 44,000 times per second. One or more of the audio channels associated with a particular video channel may be analyzed to determine if that channel is currently active.

An image analysis system and method for determining whether a channel is active and making a record of channel outages according to principles of the invention differentiates these video and/or audio data in the video and/or audio normal programming from the channel unavailable state, to determine a channel outage.

High-Definition Multimedia Interface (HDMI) is a full digital transmission interface for images and sounds, and can transmit uncompressed audio and video signals at the same time. HDMI® is a registered trademark of HDMI® Licensing LLC for hardware and software for such an audiovisual interface. In a preferred embodiment, the invention is implemented on a programmable computing device with either HDMI® repeater or HDMI® sink functionality. HDMI® An HDMI® source includes an output terminal from which an image or audio signal is output via HDMI®. An HDMI® sink includes an input terminal to which the image or audio signal is input via HDMI®. An HDMI® repeater includes one or more input terminals and one or more output terminals to act as both the HDMI® source and the HDMI® sink. A game console, recording/reproducing (DVR) device and a dedicated device such as the standalone electronic system described and referred to below as a "monitor," are each an example of an HDMI® repeater. A SmartTV is an example of an HDMI® sink.

The programmable computing device includes a CPU that controls operation, a ROM that stores control software and data, a RAM for volatile storage of executing programs and data, each of which is connected to an internal bus and operably coupled to an HDMI® input terminal, and in the case of an HDMI® repeater, operably coupled to an HDMI® output terminal.

In an embodiment implemented as a standalone electronic system (referred to as a "monitor"), the device may be interposed between a television program provider's premises equipment and the user's entertainment system, or in some instances only connected to the provider's equipment. This connection could be via an HDMI® cable or any of the various standard video and audio connection methods compatible with the user's entertainment system and television program provider's premises equipment. The fundamental object of the physical connections is to enable the invention to monitor the signals being delivered to the user's entertainment system via the television program provider's premises equipment. In an alternate embodiment the invention may be able to receive the video and audio information wirelessly, e.g., via a WiFi radio link.

In other embodiments, the invention may be implemented as software or firmware that is executable on an HDMI® sink (e.g., a SmartTV) or repeater (e.g., a game console, such as, but not limited to an Xbox One® game console developed by Microsoft Corporation, or a digital video recorder, such as, but not limited to a TiVo® digital video recorder by TiVo, Inc.).

FIG. 1 provides a high level block diagram that conceptually illustrates a television system with either an exemplary channel monitoring device or with an application (i.e., a software or firmware application, hereinafter an "application") executing on an HDMI® sink or repeater according to principles of the invention. Signal source 10 may be any technology used to communicate television program information to the receiver/decoder technology in the subscribers' building. This may be comprised of a satellite receiver, a fiber optic cable, a coaxial cable, or telephone wiring, for example. The source 10 is connected to a set-top box 20 via one or more wires and connectors of various types, or via a wireless connection. The set-top box 20 is supplied by the service provider to allow the subscriber to access programming over the system according to the terms of their agreement. The set-top box 20 may communicate the television program information to the subscriber's entertainment system 40 using various connections and protocols. Nonlimiting examples include HDMI® connectors, phono jacks, wireless technology, and others. In one embodiment, the monitoring device 30 is a standalone device, with a monitoring application 35 executing thereon, coupled to the entertainment system 40. In another embodiment, the entertainment system 40 and monitoring device 30 and application 35 are integrated in one system 50, such as a SmartTV. In another embodiment, the monitoring device 30 is a programmable HDMI® repeater such as a game console with a monitoring application 35 contained on the device. The box 20 includes controls and functionality for the user to select what programming to view at any given time. Such selection is typically made using an infrared remote control. The home entertainment system 40 may be any means of displaying the television program selected for viewing from the set-top box 20. A monitoring application 35 according to principles of the invention is executable in the home entertainment system 40 or in a device that supplies HDMI® signals from the set top box to the home entertainment system 40, in such a way as to allow the application 35 to monitor video and audio programming being sent from the box 20 to the home entertainment system 40.

In one embodiment, the monitor 30 may be situated so that either it or the home entertainment system 40 user can send infrared or radio commands 60 to the set-top box 20 to select a channel for viewing. In such an embodiment, the device 30 or system 50 includes a remote control output (e.g., an infrared output port) directed at the set top box 20, to control channels output by the set top box. By residing between the set top box 20 and home entertainment system 40 and intercepting output from the set-top box 20, the monitor application 35 analyzes only the decoded audio/video signals being rightfully supplied to a subscriber's home entertainment system 40.

Figure 2:
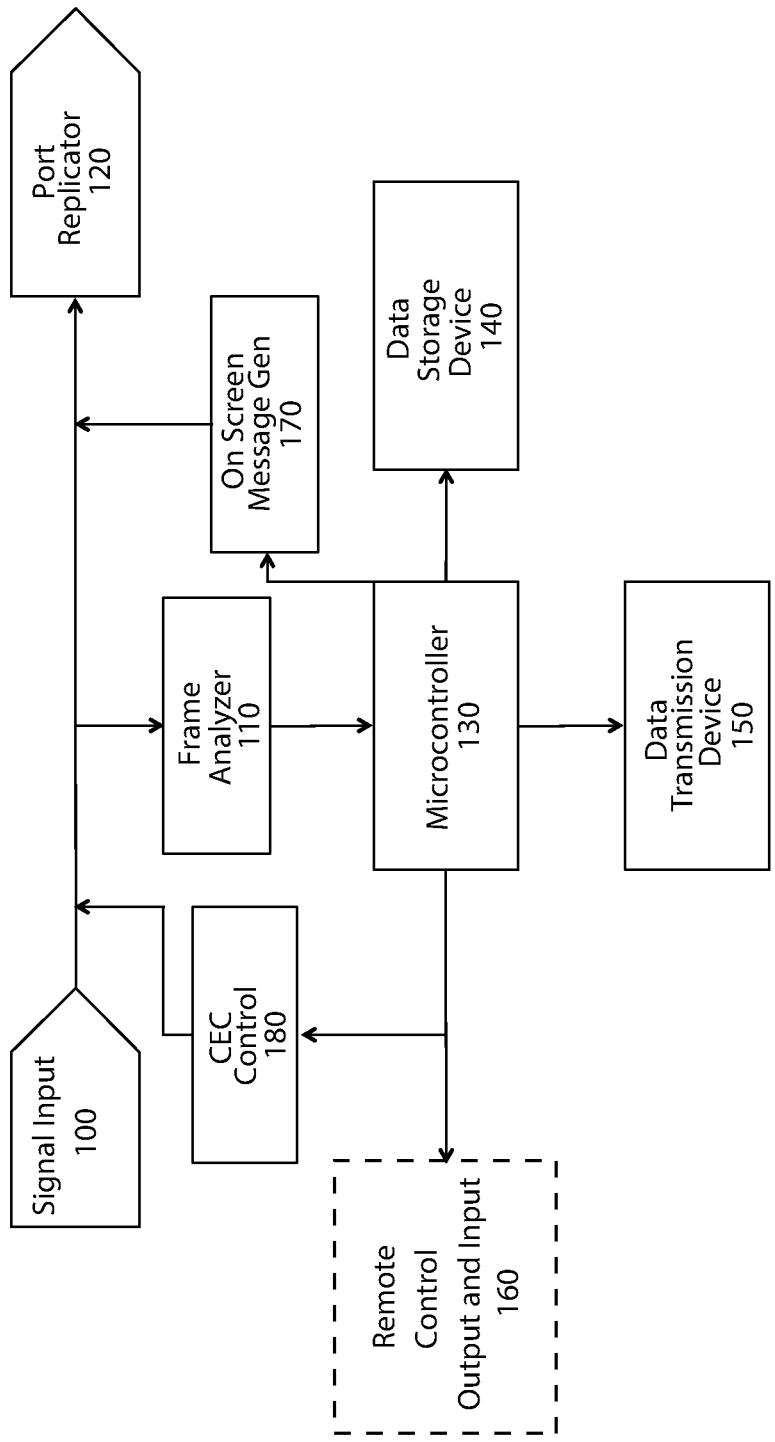
FIG. 2 is a high level block diagram that conceptually illustrates components of an exemplary channel monitoring device according to principles of the invention.

A monitor 30 according to principles of the invention may include RF or IR light emitting technology (e.g., an infrared port) that includes an emitter 160 [FIG. 2] to enable it to communicate with the television program provider's premises equipment 20 (e.g., the set-top box) in order to turn on the box 20 and change channels. In an IR embodiment, the IR light emitter 160 is capable of being positioned remotely so that it can illuminate the IR receiver on the provider's control box 20. In one implementation, the monitor 30 will be interposed between the provider's premises equipment 20 and the home entertainment system 40. This will allow the monitor 30 to intercept video and sound programming from the box 20 before it reaches the entertainment system 40. The IR emitter 160 may be positioned using an extension cable so that the light signal can be received by the provider's equipment 20 to control power and channel selection. Upon initial installation there will be a setup procedure by which the monitor 30 will be updated as to what kind of program provider is being used, the kind of set top box 20, and particular set of video channels to which the user is subscribed, preferred times for the invention to take over the use of the set top box 20 for the purpose of scanning all channels to confirm program is available, the means by which the data will be collected, and how to connect to the internet if a connection is available. Once the monitor 30 has been installed and set up, it will function autonomously. At prescribed times it will present a message to the user's television screen of the home entertainment system 40 asking any viewers that may be in the room, to push any button on their remote control to signal that they are still actively using the provider's equipment 20, and that this monitor 30 should not take over its use. If a user presses a button on a remote control in response to the message, then the monitor 30 will go back to a dormant state and wait for a period of predefined length with no remote activity by the user, or until the next assigned scanning period, whichever comes first. If a user does not press a remote button within a determined period after the message is displayed, then the monitor 30 understands that the provider set top box 20 is not in use and the monitor 30 may be employed for the purpose of scanning all channels in the user's subscription. The monitoring process entails analyzing frame data for each channel and determining if the frame data indicates an active channel or an outage. The monitor 30 sends remote control signals to the box 20 to turn on the box 20, if it is not already turned on, and to tune into each channel to be analyzed. This process may be performed with the home entertainment system 40 turned off. The monitor 30 begins sending commands to the set top box 20 via the remote control protocol that was selected during the setup process. As program channels are selected, the monitor 30 employs one or more analysis techniques to determine if the selected channel is operating normally or is out of service. Analysis techniques are discussed below. If a channel is found to be unavailable, the time and channel being tested is saved in a non-volatile memory device log 140. If a channel is found to be available and that channel was previously on the unavailable list, then that event is also logged 140. The testing of all channels continues in this fashion, running through the entire list of subscribed channels over and over again. In this fashion the stored log 140 will indicate when the channel going out of service was observed and the time when that channel was observed going back into service. When queried, the monitor 30 will download its stored data by the means that was requested during the setup process.

In a preferred embodiment, where the monitoring application 35 is contained in either an HDMI® sink 50 or repeater 30, the remote control output 60 from the device 30 or 50, and the infrared light emitter 160, are unnecessary. In such a case, channel selections may be communicated from the repeater device 30 or sink 50 to the set-top box 20 as control signals via a channel (e.g., the Consumer Electronics Control (CEC) channel) of the HDMI® connection.

Referring to FIG. 2, a high level block diagram that conceptually illustrates components of an exemplary channel monitoring device according to principles of the invention. The device may be either an HDMI® sink 50 or repeater 30 on which the monitoring application 35 executes. A signal input 100 may be comprised of any technology that allows the device to communicatively connect to the set-top box 20 and receive video and audio program information. In the preferred embodiment this connection is an HDMI® connector; although, S-Video, phono jacks, wireless technology, and other couplings may be used. The signal input 100 receives and decodes program information from the set-top box 20 in whatever form it is sent, and converts it to a form that will be usable by the frame analyzer 110.

In an HDMI® repeater 30 embodiment, a port replicator 120 provides a direct output of the exact signal that is received by the signal input 100. In an HDMI® repeater 30, the port replicator 120 is the program source for the home entertainment system 40. In an HDMI® sink 50 embodiment, a port replicator 120 is not needed in the sink device 50.

A frame analyzer 110 analyzes data collected from the signal input 100 to determine if the current program selection (i.e., channel) is active or unavailable. The frame analyzer 110 includes an arrangement of software, and/or firmware, and/or hardware to determine and analyze data corresponding to frames. The frame analyzer 110 generates information as to whether the immediate past frame was that of normal programming or the program unavailable message screen.

A micro-controller 130 manages functions in the monitoring device 30 or system 50. The micro-controller 130 takes results from the frame analyzer 110 and places the results into a data storage device 140 (e.g., hard disk, solid state disk, or memory), and/or sends the results to a data transmission device 150. The micro-controller 130 also determines when the TV of a home entertainment system 40, 50 is not in use and generates commands (e.g., remote control commands 60 or HDMI® CEC control commands) to select channels on the set-top box 20 for availability testing.

A data storage device 140 is any removable or fixed information storage technology. The purpose of the data storage device 140 is to store channel numbers and times when they are not available, for later download or transmission. Modern game consoles and SmartTV systems are equipped with hard disk, solid state drive or memory for such storage, and are nonlimiting examples of a data storage device 140.

A data transmission device 150 communicates information about the subscriber's television service to a central storage and processing site. The central storage and processing site may be accessible online. Modern game consoles and SmartTV systems are equipped with network ports or wireless radio modules for Internet connectivity, each of which is a nonlimiting example of a data transmission device 150.

A remote control output and input 160 (i.e., remote transceiver 160) is an optional component. When included, the remote control output and input 160 comprises a transmitter/receiver that may be on a long cable so that it may be situated in a position to send commands to the set-top box 20. In one embodiment, the remote transceiver 160 communicates optical (i.e., infrared) signals. Alternatively, or optionally in addition to the optical transceiver, the remote transceiver 160 may include a radio remote control circuit for systems (i.e., set-top boxes 20) that use RF remote control technology.

In embodiments with HDMI® connections, channel selections may be communicated from the repeater device 30 or sink 50 to the set-top box 20 as control signals via a channel (e.g., the Consumer Electronics Control (CEC) channel) of the HDMI® connection. In such embodiments, the remote control output and input 160 is unnecessary.

An on Screen Message Gen 170 allows the micro-controller 130 to generate a superimposed on-screen message to query the user if the user is using the program provider equipment, or if it may be diverted to channel scanning. Thus, the monitor 30 will analyze channels when the home entertainment system 40 is not in use by a user. The on Screen Message Gen 170 may comprise a frame buffer, video adapter, on-board video display components or other video display output component of an HDMI® sink 50 or repeater 30 device.

CEC Control 180 is an HDMI® remote control module and protocol that will allow the monitor 30 to send commands to the set-top box 20 over a standard HDMI® video cable. The module may comprise software, firmware and hardware. The CEC Control 180 may comprise a bidirectional serial bus operably coupled to a multi-pin connector to communicate control information between connected devices.

A monitor application 35 according to principles of the invention may employ one or more techniques (i.e., processes) to determine if a video channel is available or if it has been replaced with a blank screen or a "not in service" message. The particular wording of a not in service message is not important. Additionally, whether such a message is stationary or moving is also not important.

In the event that the output from a set-top box 20 is encrypted and/or encoded, the device 30 or system 50 will decrypt and/or decode the received output before conducting frame analysis, as described below. Additionally, in the case of implementation on an HDMI® repeater, the monitor application 35 will cause the device 30 to retransmit the input to the device 30 through a port replicator 120. In other embodiments, the device 30 may reconstruct the encrypted and/or encoded output from the set-top box 20, by using the micro-controller 130 to apply the appropriate encryption and/or encoding algorithms, and communicate the reconstructed stream to the port replicator 120 for output to the home entertainment system 40. In an implementation on a SmartTV system 50, where the system is an HDMI® sink, retransmission through a port replicator 120 is not needed.

By way of example and not limitation, High-bandwidth Digital Content Protection (HDCP), is a form of encryption commonly applied to digital audio and video content as it travels across connections, particularly DisplayPort (DP), Digital Visual Interface (DVI), and HDMI® connections. If a stream received from the set-top box 20 by the monitor device 30 is protected by HDCP, the monitor device 30 (e.g., game console) may decrypt the stream in accordance with the HDCP protocol before the monitor application conducts frame analysis. If the monitor application 35 is implemented on a SmartTV 50, the SmartTV will decrypt the stream in accordance with the HDCP protocol before the monitor application 35 conducts frame analysis.

Additionally, the monitor device 30 operating as an HDMI® repeater may re-encrypt the stream for retransmission to the home entertainment system. In such case, the monitor 30 will perform the re-encryption in accordance with HDCP protocol, including any applicable licensing requirements. HDMI® devices configured as repeaters typically include the applicable licensing and encryption algorithms. The stream transmitted from the port replicator 120 would thus be protected by HDCP, like the stream emitted from the set-top box. A home entertainment system configured to receive, decrypt and play HDCP protected streams will be able to effectively use the output from the monitor 30 in the same manner it would use output from the set-top box 20.

Figure 3:
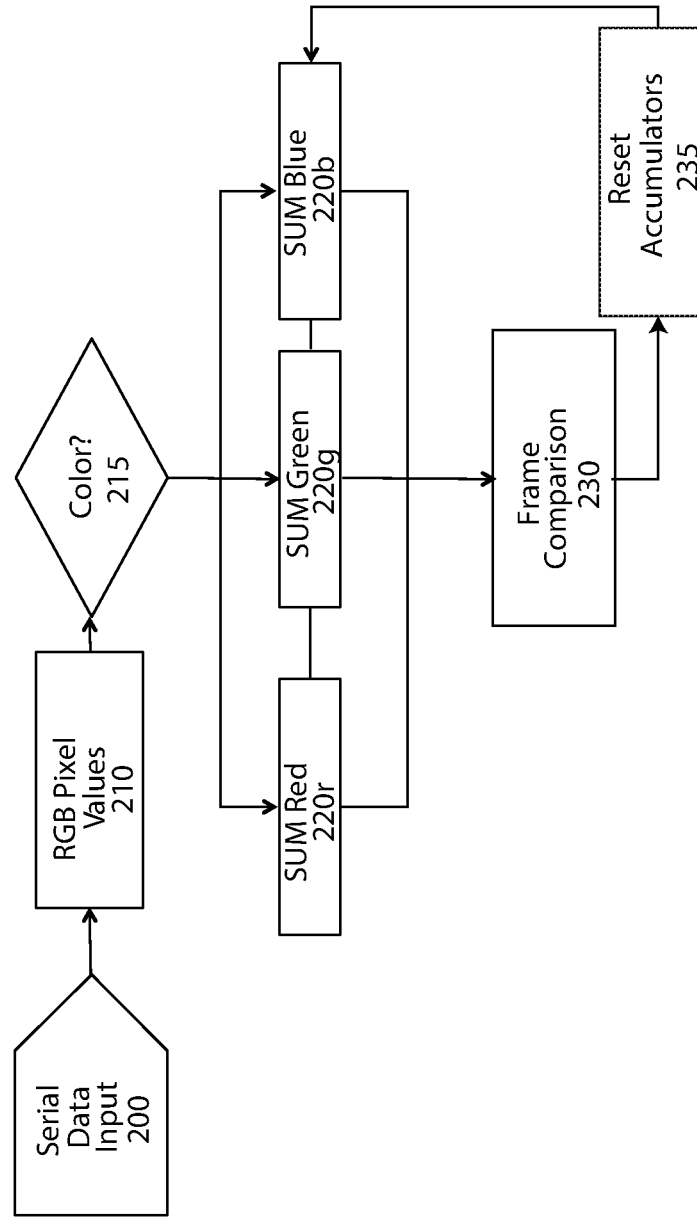
FIG. 3 is a high level flowchart conceptually illustrating steps of an exemplary frame analysis process for an exemplary channel monitoring device according to principles of the invention.

With reference to FIG. 3, one frame analysis technique entails determining if pixel data corresponds to a "not in service" type of message. Often when a particular channel becomes unavailable for any reason, the provider's system substitutes some kind of message screen that explains the current situation. Sometimes the text block of this message is moved around the screen in order to prevent damage to the end user's display technology. The theory of operation of this analysis technique is that whatever place holder image is being sent from the system in lieu of the normal program, the total brightness of all red, green, and blue pixel elements in the image will not vary appreciably. If the total brightness of all the red, green, and blue sub-pixels in each frame is consistent from frame to frame, the monitor 30 may conclude that a static image is being presented and the channel is not functioning. That being the case, this method of frame analysis captures the image data pixel by pixel as it is sent from the box 20 to the monitor 30 or system 50. Serial data input 200 receives the signal that is created by signal input 100. Serial data input 200 may perform some data decoding or encoding in preparation for the analysis process. The incoming data stream is parsed into values (e.g., numbers) for each of the red, green, and blue components 210 for each picture element. RGB pixel values 210 is a hardware and/or software module that converts incoming image data into three integer values for brightness for each sub-pixel, red, green, and blue. This method applies to color data, as determined in step 215. The color component values are summed in separate accumulator registers 220r, 220g, 220b or temporary data stores. The accumulator registers 220r, 220g, 220b accumulate the values for each pixel in the frame as a positive integer. Three registers in this module may generate a number for all the red, green, and blue pixels in any given frame of image data. Finally, as all the data for a given frame has been parsed and added in this manner, the frame comparison module 230 compares these numbers to those of the previous frames, and if they are consistently very close to one another, it provides a signal to the micro-controller 130 that this channel is not available. The frame comparison module 230 may comprise software, firmware and hardware 230. The frame comparison module 230 checks the three values in the registers 220 at the finish of each frame to see if they are very close to previous counts. If they are, then it is likely that the channel is unavailable. After this determination, the frame comparison module 230 will force a reset of the three registers 220. The frame comparison module 230 will reset 235 the accumulator registers 220r, 220g, 220b at the beginning of every new frame.

Figure 4:
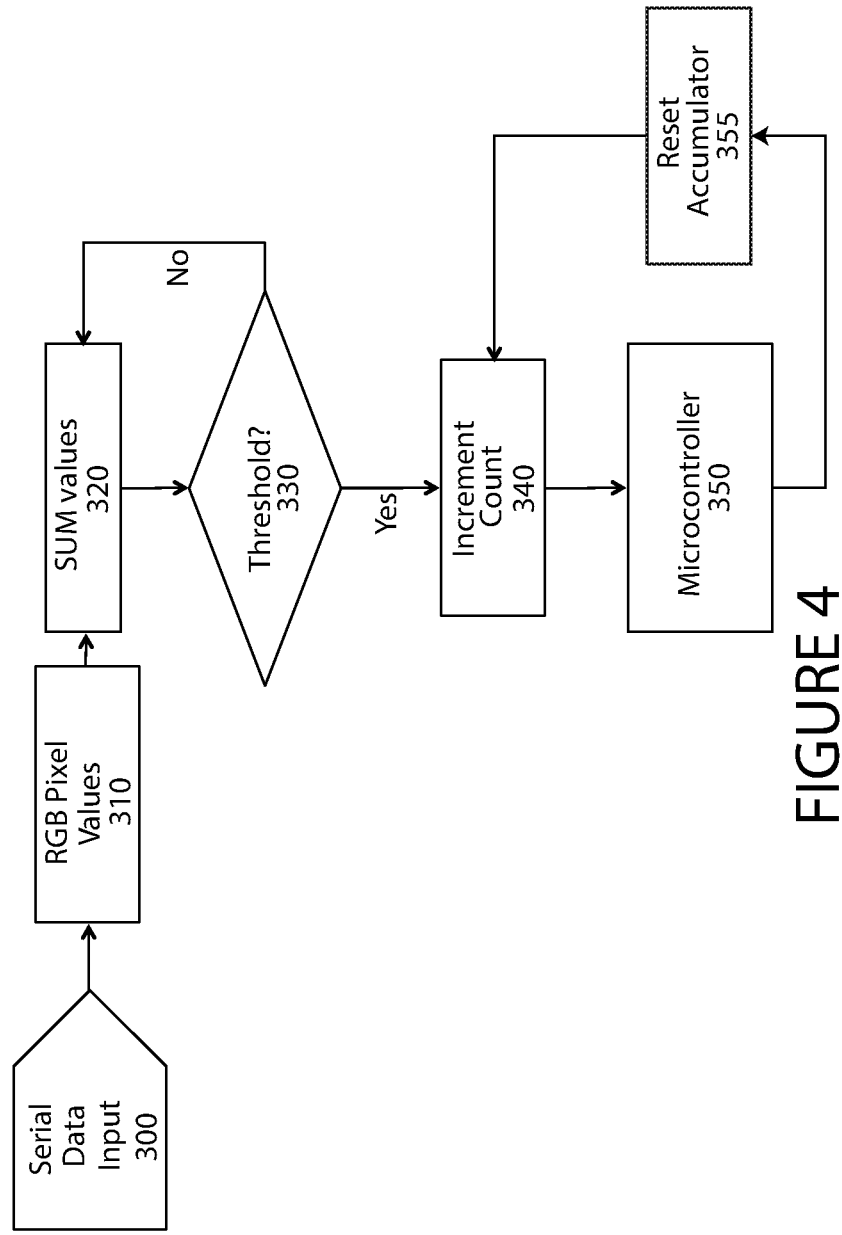
FIG. 4 is a high level flowchart conceptually illustrating steps of another exemplary frame analysis process for an exemplary channel monitoring device according to principles of the invention.

As conceptually illustrated in FIG. 4, another frame analysis methodology determines the number of pixels exceeding a threshold brightness to assess if a channel is active or inactive. Often when a particular channel becomes unavailable for any reason, the provider's system substitutes some kind of message screen that explains the current situation. Sometimes the text block of this message is moved around the screen in order to prevent damage to the end user's display technology. The theory of operation of this invention is that whatever place holder image is being sent from the system in lieu of the normal program, the total number of pixels that exceed a specific brightness will be relatively constant. Consequently, if the count is consistent from frame to frame, then the channel is static and unavailable. Serial data input 300 receives the signal that is created by signal input 100. Serial data input 300 may perform data decoding or encoding in preparation for the analysis process. Standard hardware and software technology, well known in the art, are used to parse the incoming data stream into numbers for each of the red, green, and blue components for each picture element. RGB pixel values 310 is a hardware and/or software module that converts incoming image data into three integer values for brightness of each sub-pixel, red, green, and blue. RGB pixel values 310 may include decoding functions and data buffer for part or all of an image frame. These three integer values are summed 320 to represent the total brightness of that pixel. SUM values 320 receives the three values from the RGB pixel values 310 and arithmetically adds them together. This sum represents the total illumination of the given pixel. Then the value for that pixel is compared to a preset threshold value 330. Threshold 330 receives the sum value 320 and tests to see if it exceeds some number, as a test of the pixel brightness. If the sum is less than the threshold value then nothing happens with that data, and the module waits for the sum from the next pixel. If the pixel brightness is above the threshold, a counter 340 is incremented. If the sum value 320 exceeds the threshold value, threshold 330 instructs counter 340 to increment count by one for that pixel. If the sum value 320 is less than the threshold value, then nothing happens with that data, and the module waits for the sum from the next pixel. After an entire frame, the counter has determined the number of pixels that exceed the given threshold value. When all the pixel data for a given frame has been tested, the micro-controller 350 compares the count 340 to that of previous frames. If they are consistently very close to one another, it provides a signal to the micro-controller 130 that this channel is not available. Micro-controller 350 will reset 355 the counter 340 at the beginning of every new frame.

Figure 5:
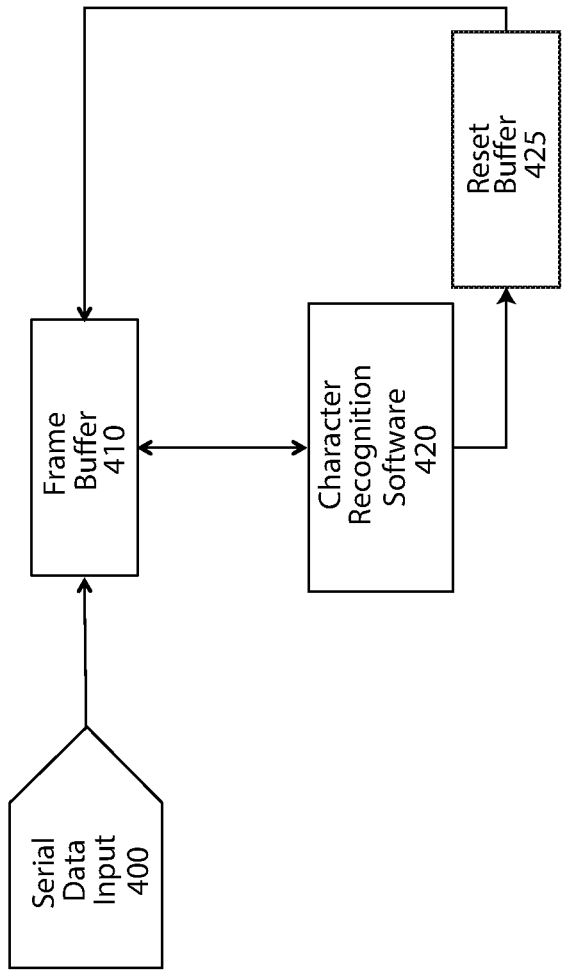
FIG. 5 is a high level flowchart conceptually illustrating steps of another exemplary frame analysis process for an exemplary channel monitoring device according to principles of the invention.

In FIG. 5, steps of another exemplary frame analysis process for an exemplary channel monitoring device according to principles of the invention are conceptually illustrated. This process employs OCR to determine if a video channel is available or if it has been replaced with a "not in service" message. When a particular channel becomes unavailable for any reason, the provider's system typically substitutes some kind of message screen that explains the current situation. Sometimes the text block of this message is moved around the screen in order to prevent damage to the end user's display technology. The theory of operation of this method is that if a place holder image includes text stating the channel is not available, the given frame may be stored in a memory buffer 410 and then parsed and subjected to optical character recognition techniques 420 to determine whether the channel is available or not. This technique stores a complete image frame from the serial data input 400 in a memory buffer 410, then runs optical character recognition software 420 that parses the image, looking for text corresponding to a channel unavailable message. Serial data input 400 receives the signal that is created by signal input 100. Serial data input 400 may perform some data decoding or encoding in preparation for the analysis process. Frame Buffer 410 is a hardware and software module that converts incoming image data into a memory mapped array of pixel data. This block may include decoding functions. Optical character recognition software 420 analyzes the information in the frame buffer as the frame is loaded, to determine if there is text in the image and if so, whether the text indicates that the channel is not available. This software 420 is communicatively coupled to micro-controller 130. If the software 420 finds text stating that the channel is unavailable, then it provides a signal to the micro-controller 130 that this channel is not working. The software 420 resets the frame buffer 410 at the beginning of each frame.

Figure 6:
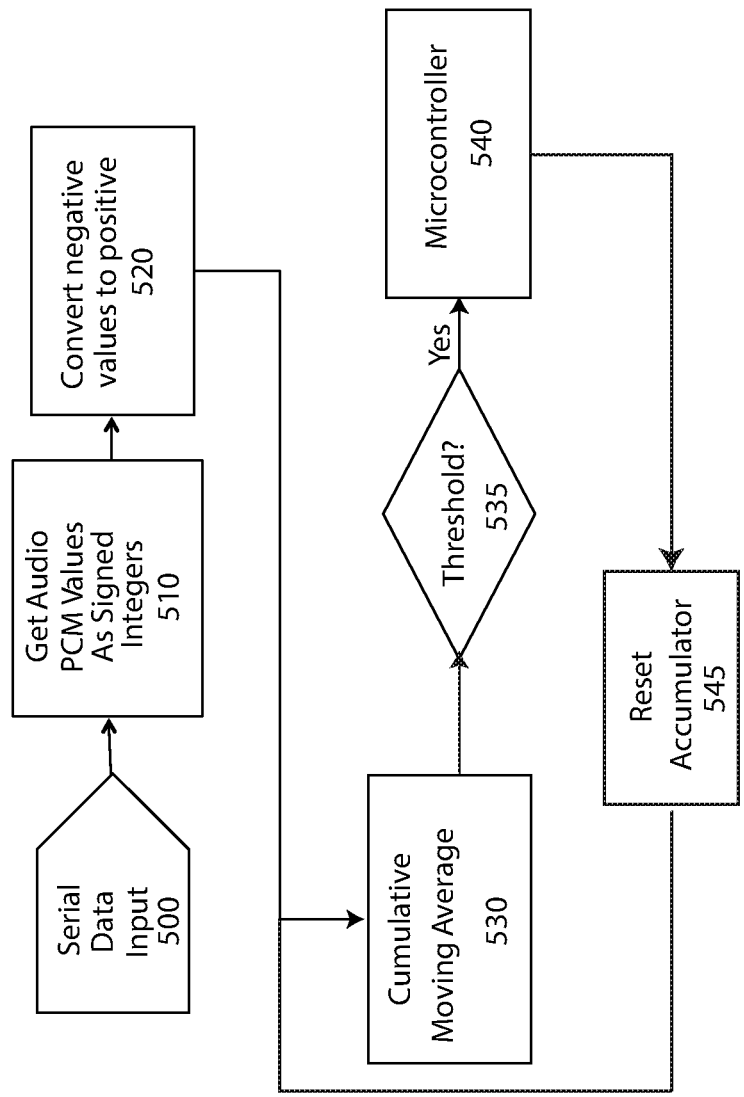
FIG. 6 is a high level flowchart conceptually illustrating steps of another exemplary frame analysis process for an exemplary channel monitoring device according to principles of the invention.

Referring to FIG. 6, a high level flowchart conceptually illustrating steps of another exemplary frame analysis process for an exemplary channel monitoring device according to principles of the invention is provided. This technique analyzes the audio tracks of a given channel. Often when a particular channel becomes unavailable for any reason, the provider's system substitutes some kind of message screen that explains the current situation. A key feature of these messages is that they have no audio content. Consequently, when a channel becomes unavailable on a television distribution network, usually the audio track is quiet. Even the quietest parts of regular programming have a small amount of noise in the background. In contrast, when a channel becomes unavailable, there is zero audio information. To implement this technique, serial data input 500 receives the signal that is created by signal input 100. Serial data input 500 may perform some analog to digital conversion, or data decoding, in preparation for the analysis process. Get Audio PCM Values as Signed Integers 510 is a hardware and software module that converts incoming audio data into some number of signed integer values for instantaneous amplitude of the sound tracks for that channel. In a pulse code modulation (PCM) stream, the amplitude of an analog audio signal is sampled regularly at uniform intervals, and each sample is quantized to the nearest value within a range of digital steps. Multiple sound tracks may be combined by adding PCM values in the same time slot, or individual tracks may be analyzed separately. Thus, Get PCM values 510 decodes the audio data into standard units of amplitude per sample. Convert negative 520 makes all values positive binary numbers. By converting the negative half of an audio signal to positive numbers, the signal may be integrated over time without canceling itself. Cumulative Moving Average (CMA) 530, which may be implemented as software, continually averages PCM values over a fixed period of time, perhaps at the frame rate. The Cumulative Moving Average software 530 continuously runs an average of all of the PCM values during the period of a frame transmission. This average is run continuously while the monitor 130 is testing a specific channel from the provider. After some number of frames have been averaged, the micro-controller 540 tests the CMA value to see if it exceeds some minimum threshold 535. If it does, that indicates that the channel under test is available. If it does not, then the micro-controller 540 sends a signal to micro-controller 130 that the channel is unavailable. The CMA value is reset 545 whenever a new channel is selected for testing.

An exemplary algorithm for computing CMA is briefly described below:

$$CMA_n = \frac{CMA_o \times (n-1) + X}{n}$$

Where:

n is the number of samples in the average, e.g., the number of samples for one frame;

$CMA_n$ is the new moving average;

$CMA_o$ is the old (i.e., prior) moving average; and

X is the new sample to be added to the average.

In this manner, the CMA is updated for each new audio sample. Initially, a frame of registers may be populated with null or zero values for the audio samples. After a frame of samples, the registers may be populated with sample values, enabling an accurate moving average. By comparing the calculated CMA with a determined threshold, the module determines whether the channel signals are devoid of audio, indicating an outage.

Outage durations may be determined from initial and subsequent analyses of a channel using any of the frame analysis methodologies described above. Repeated outage determinations evidence a channel outage of at least the time period between the initial and subsequent analysis of the channel, without any intervening frame analysis that reveals channel activity.

Channel outage determinations and related data such as service provider information, end-user (i.e., subscriber) information, date, time and location, may be stored locally and/or sent to a remote computer system for storage, analysis and reporting. The remote computer system may include a server coupled to the monitor 30 or system 50 via network connections. The remote computer system may include a database management system configured for such storage, analysis and reporting. The remote computer system may associate other data with the collected channel outage determinations and related data. Such other data may include weather condition data, and/or consumer complaint data, and/or power utility outage data for each geographic area corresponding to the collected data.

The remote computer system may automatically, or upon user command, report outages to a service provider, governmental authority, or other recipient. Such a report may optionally include a refund request. The remote computer system may also analyze the data for patterns, such as outages that simultaneously affect a geographic region, or repeated outages for a geographic region. Such analysis may reveal outages due to inclement weather or persisting problems with infrastructure or service problems that affect the quality of service in a given area.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A method for determining the state of a television channel supplied to a television through an appliance, said appliance comprising a tuner and outputting television signals for a tuned television channel to a connected television, said method comprising:

sequentially generating tuning control signals to cause the appliance to tune to each television channel from a plurality of available television channels that supply television program content, and, for each television channel to which the appliance is tuned;

receiving television signals for a tuned television channel from the appliance; and determining if the television signals for the tuned television channel correspond to a channel that is inactive by performing frame analysis of the televisions signals for the tuned television channel; and if the television signals for the tuned television channel correspond to a channel that is inactive, communicating an identification of the channel and a time of the determination to a remote computing system; and producing a message for display on the television, said message requesting a user to perform a detectable action to indicate that the user is currently using the television, and delaying further sequentially generating tuning control signals for a determined time period after the detectable action is performed.

2. The method for determining the state of a television channel supplied to a television through an appliance according to claim 1:
said step of sequentially generating tuning control signals further comprising communicating said tuning control signals to the appliance via a communication channel.

3. The method for determining the state of a television channel supplied to a television through an appliance according to claim 1:
said step of sequentially generating tuning control signals further comprising communicating said tuning control signals to the appliance via a wireless communication path.

4. The method for determining the state of a television channel supplied to a television through an appliance according to claim the detectable action comprising causing a remote control to emit a sensible signal.

5. The method for determining the state of a television channel supplied to a television through an appliance according to claim 1, further comprising storing data corresponding to determinations of inactivity.

6. The method for determining the state of a television channel supplied to a television through an appliance according to claim 1, further comprising,
for each television channel to which the appliance is tuned, communicating a subscriber identification along with the identification of the channel and the time of the determination to the remote computing system.

7. The method for determining the state of a television channel supplied to a television through an appliance according to claim 6, further comprising
producing a credit request including a subscriber identification and a time and duration of inactivity for the television channel, for each television channel determined to be inactive.

8. The method for determining the state of a television channel supplied to a television through an appliance according to claim 1, the frame analysis comprising determining if total brightness of pixel elements remains constant between successive frames.

9. The method for determining the state of a television channel supplied to a television through an appliance according to claim 1, the frame analysis comprising determining if a total number of pixels that exceed a specific brightness is constant between successive frames.

10. The method for determining the state of a television channel supplied to a television through an appliance according to claim 1, determining the frame analysis comprising optical character recognition of text in a frame for the channel.

11. The method for determining the state of a television channel supplied to a television through an appliance according to claim 1, the frame analysis comprising determining if the television signals are devoid of audio signals.

12. The method for determining the state of a television channel supplied to a television through an appliance according to claim 1, the frame analysis comprising determining at least one of:
if total brightness of pixel elements remains constant between successive frames;
if a total number of pixels that exceed a specific brightness is constant between successive frames;
if a frame for the channel contains an inactive channel text message; and
if the television signals are devoid of audio signals.

13. The method for determining the state of a television channel supplied to a programmable television through an appliance according to claim 1, the frame analysis comprising determining at least one of:
if total brightness of pixel elements remains constant between successive frames;
if a total number of pixels that exceed a specific brightness is constant between successive frames;
if a frame for the channel contains an inactive channel text message; and
if the television signals are devoid of audio signals.

14. A method for determining the state of a television channel supplied to a programmable television through an appliance, said appliance comprising a tuner and outputting television signals for a tuned television channel, said method comprising:
sequentially generating tuning control signals to cause the appliance to tune to each television channel from a plurality of available television channels that supply television program content, and, for each television channel to which the appliance is tuned:
on a programmable television, receiving television signals for the tuned television channel from the appliance; and
determining if the television signals for the tuned television channel correspond to a channel that is inactive by performing frame analysis of the televisions signals for the tuned television channel; and
if the television signals for the tuned television channel correspond to a channel that is inactive, communicating an identification of the channel and a time of the determination to a remote computing system; and
producing a message for display on the television, said message requesting a user to perform a detectable action to indicate that the user is currently using the programmable television, and delaying further sequentially generating tuning control signals for a determined time period after the detectable action is performed.

15. The method for determining the state of a television channel supplied to a programmable television through an appliance according to claim 14, the detectable action comprising causing a remote control to emit a sensible signal.

16. The method for determining the state of a television channel supplied to a programmable television through an appliance according to claim 14, further comprising transmitting, to the remote computing system, data corresponding to determinations of inactivity.

* * * * *